United States Patent [19]
Mayne

[11] 3,757,304
[45] Sept. 4, 1973

[54] METHOD FOR APPLYING MOVEOUT CORRECTIONS

[75] Inventor: William H. Mayne, San Antonio, Tex.

[73] Assignee: Petty Geophysical Engineering Company, San Antonio, Tex.

[22] Filed: Sept. 27, 1971

[21] Appl. No.: 184,039

Related U.S. Application Data

[63] Continuation-in-part of Ser. No. 849,769, Aug. 13, 1969, abandoned.

[52] U.S. Cl............... 340/15.5 TD, 340/15.5 TC, 340/15.5 CF
[51] Int. Cl............................................. G01v 1/36
[58] Field of Search............. 340/15.5 TD, 15.5 CF, 340/15.5 TC, 15.5 DP

[56] References Cited
UNITED STATES PATENTS

| | | | |
|---|---|---|---|
| 3,275,979 | 9/1966 | McAlpin...................... | 340/15.5 TC |
| 3,323,104 | 5/1967 | Hadley et al................ | 340/15.5 TD |
| 3,417,370 | 12/1968 | Brey............................ | 340/15.5 TC |
| 3,648,227 | 3/1972 | Sangbush.................... | 340/15.5 TD |

Primary Examiner—Benjamin A. Borchelt
Assistant Examiner—N. Moskowitz
Attorney—Tom Arnold, James L. Jackson et al.

[57] ABSTRACT

Methods for applying time-variable corrections to seismic traces in order to decrease the inherent seismic signal frequency shift. A significant reduction in signal frequency shift is obtained by correcting the seismic traces to a common reference, distance or time. The distance reference is preferably at an appreciable distance from the source and is nearer the longest source-to-detector distances. The time reference is preferably less than the time on the far trace and may be selected in view of possible subsequent conversion of time to depth. Corrections can be made in a plurality of discrete steps rather than the conventional one-step correction to a source-to-detector distance equal to zero.

16 Claims, 6 Drawing Figures

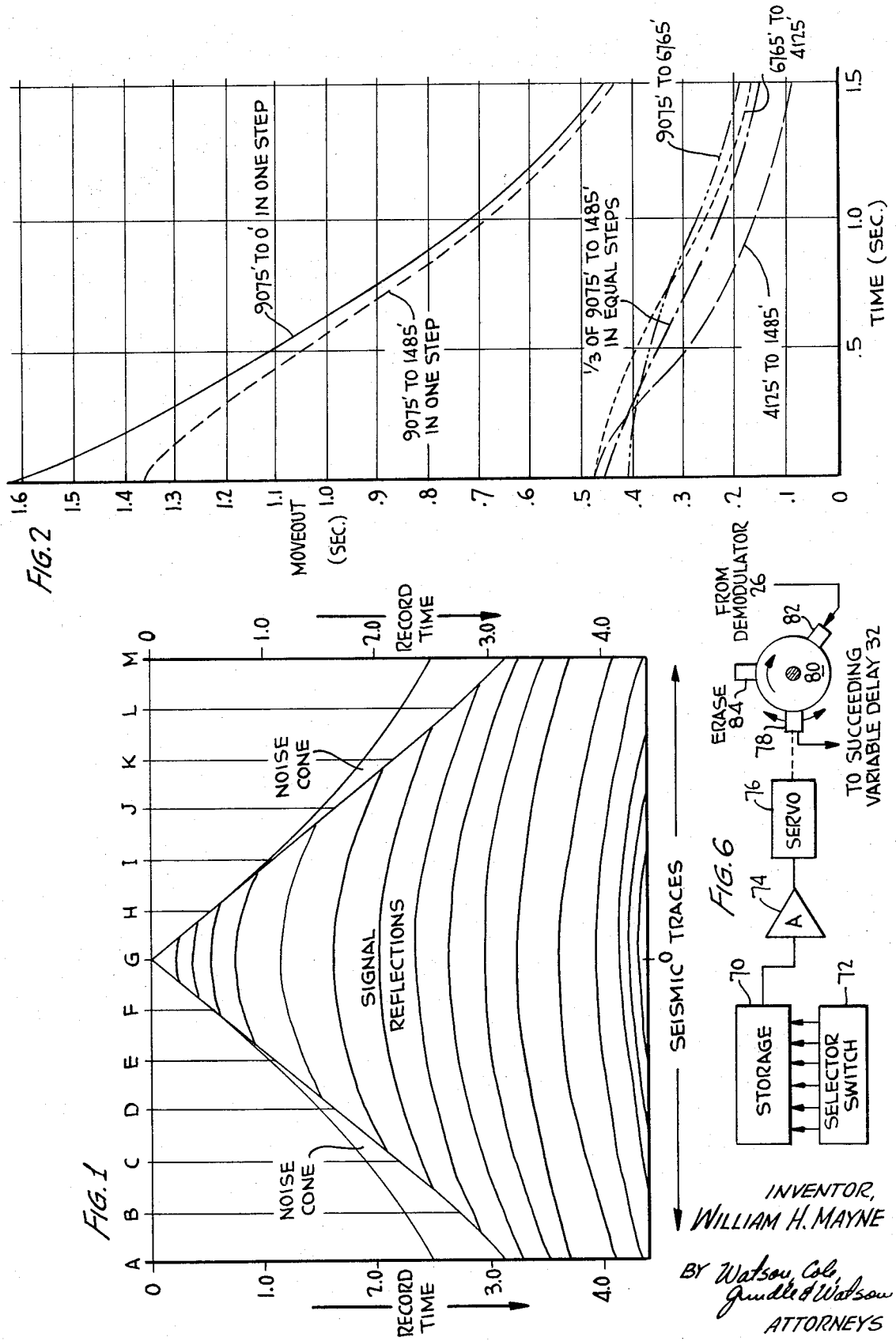

METHOD FOR APPLYING MOVEOUT CORRECTIONS

This is a continuation-in-part of U. S. Pat. application Ser. No. 849,769 filed Aug. 13, 1969, and now abandoned.

This invention relates to a method for applying time-variable corrections to seismic traces and which embodies an application directed to a method for correcting seismic traces to minimize the frequency changes introduced in the seismic signals by moveout corrections.

Seismic reflections are normally obtained by recording the signals produced from a seismic source at a given location which signals are detected by a number of seismic detectors located at varying distances from the seismic source. Prior to preparing a single coverage display or to stacking the individual seismic traces it is necessary to correct the traces, inter alia, for normal moveout. Normal moveout may be defined as the time difference that exists in the reception of signals from different seismic detectors due to the separation of the detector from the seismic source. Obviously, detectors located at greater distances from the seismic source will receive reflected signals from a given common reflection point below the surface a longer time after the reflected signals are received by detectors located in closer proximity to the seismic source. It is a common practice to apply a time-variable correction to the traces removed from the seismic source to shift the times of each trace to the times of a hypothetical trace located at the source. This is done in order that the reflections on each of the traces from the various detectors located at different distances from the seismic source will be in alignment with a reference trace at the source. It is applied prior to further processing of the seismic traces, such as stacking, or summing. This time-variable correction is large for the initial time portion of the record and decreases for the subsequent portions of the record.

The alignment of seismic traces by the application of time-variable corrections to the reflection signals thereon causes an alteration in the frequency of the reflection signals. Previously, the correction has been applied to all traces not at the source to produce reflection coincidence with a trace at the source or an imaginary trace at the source, since traces at the source may not always be obtained. The signal time shifting causes a decrease in the reproduced frequency of the seismic signal on those traces that have been corrected for moveout. This frequency distortion introduces an error in the resulting seismic traces which represents an undesirable distortion of the seismic signals, and degrades the summation of the seismic traces.

In a broader sense, the method disclosed herein is applicable to reduce distortion of seismic traces during a conversion to a time-dependent variable, such as for example from a time scale to a depth scale. It is known that the signal propagation velocity varies as a function of depth and changes in the various geological formations. Such conversions require a determination of the signal propagation velocities through the earth's strata, to convert each trace on a seismic section from time to depth.

It has not been until recently that seismic velocities could be determined so that such seismic data corrections could be achieved; however, the increased processing and analyzing capabilities made possible by the development and exploitation of digital computer techniques have enabled such advances to be attained. Processing and analysis techniques, such as are disclosed in U. S. application Ser. No. 765,943, filed Oct. 8, 1968 and assigned to the same assignee, now exist whereby the velocities can be computed so that plots of average velocity versus record time may be obtained, and from such information the conversion of a time-scale record section to a depth-scale record section is easily made by one having skill in this art.

A primary object of this invention is to provide a method for applying time-dependent variable corrections to seismic signal traces which will greatly reduce the frequency distortion of the seismic signals produced by the process.

Another object of the invention is to provide an improved method for correcting seismic signals with normal moveout corrections to reduce the distortion of the signals thereon.

Another object of the invention is to reduce distortion of seismic traces during the conversion from a time scale to a depth scale.

In accordance with one aspect of the improved method, the moveout corrections are preferably applied to selected far traces in a number of steps rather than in one step as formerly done in those instances when more distant traces are to be corrected by subtracting the moveout time to provide reflection coincidence with the reference trace at the source. In accordance with another aspect of the improved method, the moveout corrections are applied to selected near traces to produce reflection coincidence with the more distant traces and such a process may be denoted as reverse moveout. In the instance where the more distant traces are corrected by subtracting the moveout time, the resultant signal frequencies are reduced as a result of the correction process. Conversely, when the required moveout correction is added to the closer distance traces, the resultant signal frequencies are greater than the initial signal frequencies. The application of the required moveout corrections in accordance with the methods disclosed herein will result in a considerable reduction of the frequency changes or alterations of the seismic signals as compared to the prior practice.

As used throughout this specification, the terms "far traces" or "more distant traces" and "near traces" or "near signal traces" are defined to indicate seismic signals obtained from detectors located more remotely from the seismic source and seismic signals obtained from detectors located nearer to the seismic source, respectively.

The description of the improved method of applying time-dependent variable corrections to signal traces will be more readily understood by reference to the drawings wherein:

FIG. 1 illustrates signal traces obtained from a plurality of detectors located at different distances from the seismic source and indicating the normal moveout corrections to be applied to the traces to produce reflection coincidence;

FIG. 2 is a graphical representation of the moveout as a function of record time for different methods of applying moveout corrections;

FIG. 6 illustrates apparatus for applying a variable time shift to a seismic signal.

Figure 3:
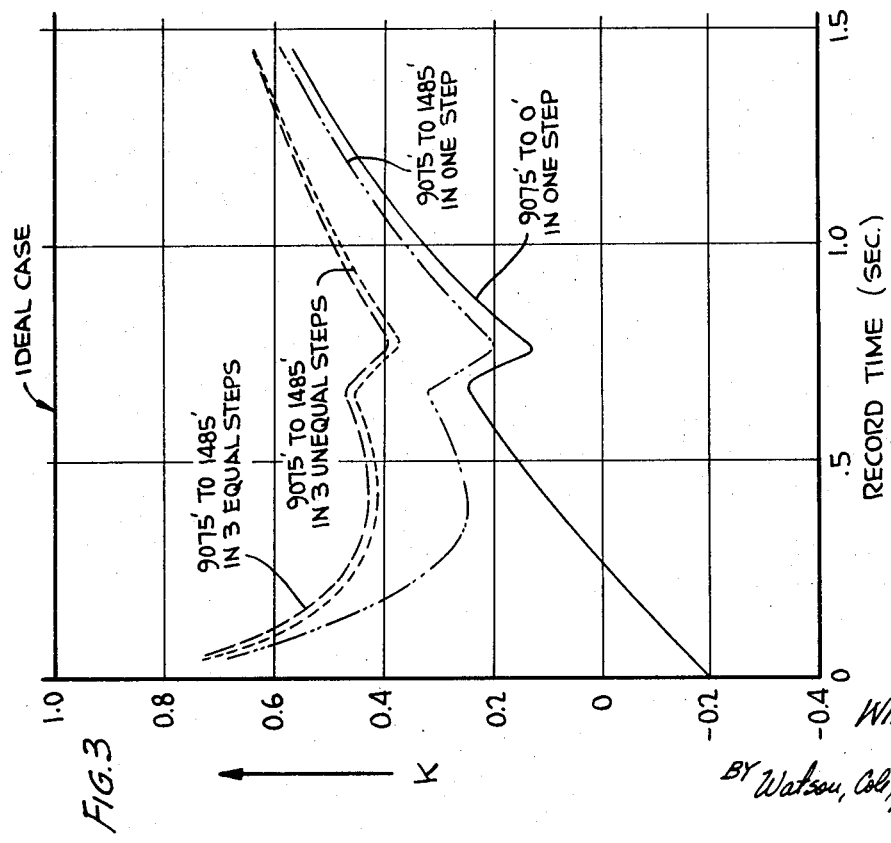
FIG. 3 is a plot of the ratio of the corrected frequency to the original frequency as a function of the record time for different methods of applying the moveout correction when the moveout is subtracted from the far traces to produce reflection coincidence.
Figure 4:
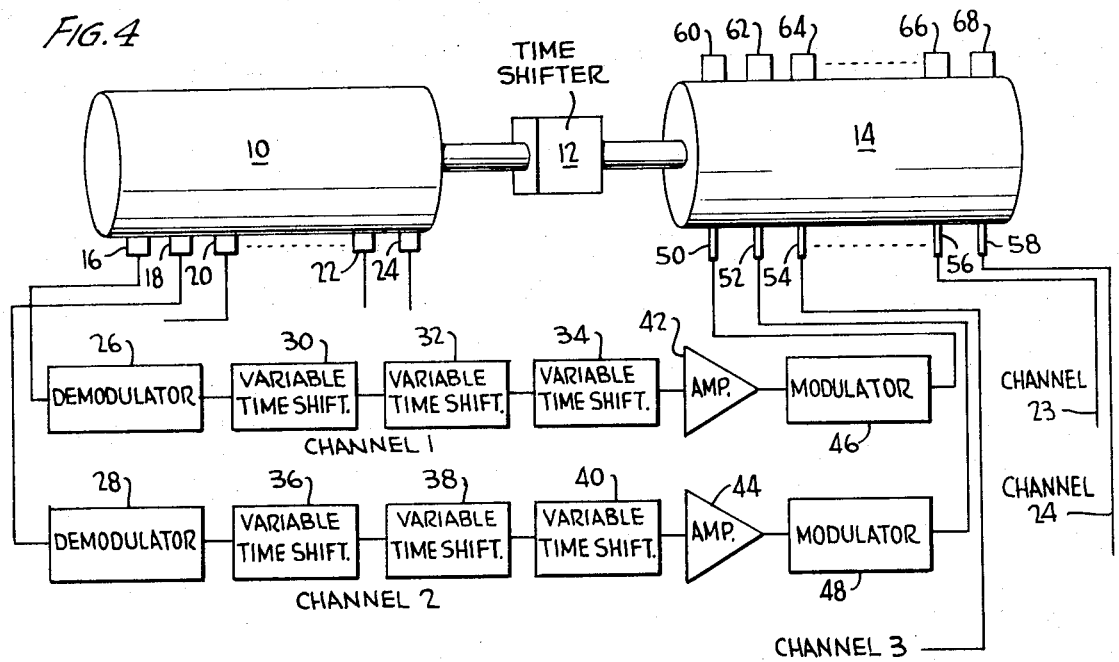
FIG. 4 illustrates, in block diagram format, apparatus for carrying out the inventive steps of the method of applying time-dependent-variable corrections.

FIG. 1 shows a representative plot of a collection of traces obtained from detectors located at different distances from the seismic source and the time, represented by the vertical line from traces A, B, C, ... M to the respective signal reflection, indicates the relative moveout of each of the traces with respect to one another, assuming the normal static corrections have been applied to each trace. Normally, in accordance with prior art methods of applying moveout corrections to the seismic trces, the moveout for each signal trace would be determined and the necessary moveout corrections would be applied to each of the traces in a single step by subtracting the moveout time from the more distant traces in order to provide a reflection coincidence with the signals on the hypothetical trace at the source, trace G. As shown in FIG. 1, the near traces, for example traces F and H, have a lesser moveout for any selected reflection than the far traces, for example traces B and L. For a discussion of prior art methods and apparatus for determining normal moveout corrections reference is made to U. S. Pat. No. 3,417,370 issued to J. R. Brey.

The following is the formula for determining the frequency change introduced by variable time shifts such as the moveout correction:

$$F_c = F_o ( 1 + dt/dT )$$

1

In the above formula, $F_c$ represents the corrected frequency, and $F_o$ represents the original recorded frequency, $t$ represents the moveout, and $T$ represents the record time scale of the corrected trace. (The time on the trace after application of the time-dependent-variable correction.)

The algebraic sign of $dt/dT$ will be determined by the direction in which the correction is made, i.e., correction of the far trace to the near trace will result in a negative value, whereas moving the near trace into time coincidence with the far trace will result in a positive rate of change.

If it is recognized that any degree of correction can be made in a number of discrete steps in which $dt/dT$ is the total rate of change of moveout, and $dt_1/dT_1$, $dt_2/dT_2$, $dt_3/dT_3$ are the rates of change of moveout of the discrete steps, the above formula becomes:

$$F_c = (1 + dt_1/dT_1 ) (1 + dt_2/dT_2 ) (1 + dt_3/dT_3 ), \ldots (1 + dt_n/dT_n ) F_o$$

2

Correction of the more distant traces to produce reflection coincidence with the closer traces causes a decrease in the reproduced frequency since $dt/dT$ will have a negative algebraic sign. It should be noted that zero frequency is obtained whenever $dt/dT$ equals minus one, and no useful result will be obtained in such an instance. The same total correction may be effected in several steps as indicated in equation (2).

If, however, the required moveout correction is added to the near traces to produce reflection coincidence with the far traces, the rate of change of moveout will be positive, and the corrected frequency will be greater than the recorded frequency. The increase will be properly indicated by formulae (1) and (2).

If the rate of change of moveout is minus unity, as would be required under the above example to convert the far trace to the near trace, the frequency of the far trace would be reduced to zero, or the output would be a direct current and the signal would be lost.

The effect of applying moveout corrections to seismic traces by different methods is illustrated in FIG. 2. The solid line represents a typical moveout correction wherein a group of seismic traces have been corrected by causing a reflection coincidence between the far traces and the near traces by subtracting the moveout from the traces more remotely removed from the seismic source where the most removed seismic trace was 9,075 feet from the source and the correction was made to a trace at the source, in one step. The dashed curve represents the correction of the seismic traces from 9,075 feet to a datum of 1,485 feet, since in some instances it may be unnecessary to correct the normal moveout to zero feet (E.G., before summing traces from the same CRP). This results in a less rate of change of moveout than for the curve representing the change from 9,075 feet to zero feet.

The remaining curves represent the application of normal moveout corrections in comparable steps from 9,075 feet to 6,765 feet; from 6,765 feet to 4,125 feet; and from 4,125 feet to 1,485 feet.

In applying normal moveout correction to seismic traces the ideal situation would be to make such corrections without altering the actual recorded frequency of the seismic signals. The ideal situation is more nearly approached by the methods of this invention than those of the prior art. When $dt/dT$ (in equation 1) is zero, the corrected trace will be the same as the original trace. In actual practice, when the far trace is being corrected to a trace at the source, $dt/dT$ will be negative and the frequency of the corrected trace will be lower than the frequency of the originally recorded trace. If $dt/dT$ is small, the frequency of the signal after correction will be only slightly less than the frequency in the originally recorded trace. As $dt/dT$ increases and approaches minus one, the frequency after correction will decrease and approach zero. When $dt/dT$ is equal to minus one, the output will be zero frequency. In other words, the output after correction will consist of a repetition of the amplitude at one record time from the originally recorded trace. When $dt/dT$ becomes more negative, the frequency of the signal after correction will become negative. This means that the output trace consists of a series of samples from the originally recorded trace, but the sampling will be in the opposite direction along the trace than when the output frequency is positive.

The solid line in FIG. 3 illustrates the change in frequency for converting a trace from a source-to-detector distance of 9,075 feet to the normal reference, zero feet. Note that from record time zero seconds to record time, 0.25 seconds, $K$ is negative. This means that the original trace is read backwards from record time zero out to 0.25 seconds and then read forward for the remainder of the record. This problem can be overcome if a reference distance of 1,485 feet is selected. The dashed-dotted line indicates the results of converting the originally recorded trace at 9,075 feet to a reference of 1,485 feet. The value of K is larger at all record times and is nearer the ideal case, K equal to one. At no time is the record read backward (a negative K). A further improvement may be made by using a reference trace farther from the source such as a source-to-detector distance about 6,300 feet.

Muting or deletion of the initial portion of a far trace is well known in the art. It is better to delete the portion of the record from zero time out through the portion identified as "Noise Cone" in FIG. 1. This would mean that the first two "signal reflections" would be used only from trace G. The third and fourth reflections would be used from traces F, G, and H. Reflections from progressively later record time would be used from progressively more traces, until all available traces are used. A time-dependent reference can be selected. One procedure for the time-dependent reference would be to use one-half to seven-tenths of the moveout for a reflection between trace G and the most remote trace used; such as for the third reflection, the moveout from trace G to trace H. Successively deeper reflections would use the more remote traces such as I, J, K, etc. However, the curvatures for the deeper traces become less and less so the distortion would become less.

As shown in FIG. 3, the ideal situation is indicated or represented by the straight line across the top of the Figure at K equals one, where K represents the ratio of the frequency after correction to the original frequency. The dash-dotted curve shown in FIG. 3 represents the case where an arbitrary signal trace located at 9,075 feet from the source has been corrected to obtain signal reflection coincidence with an arbitrarily selected signal trace located at 1,485 feet from the source.

The upper curve in FIG. 3 illustrates that a moveout correction from 9,075 feet to 1,485 feet has a real value (K does not equal zero for any record time).

The curve representing a single step correction from 9,075 feet to zero feet is illustrated as a solid line and indicates that greater moveout corrections result in greater frequency changes.

DESCRIPTION OF APPARATUS

Figure 5:
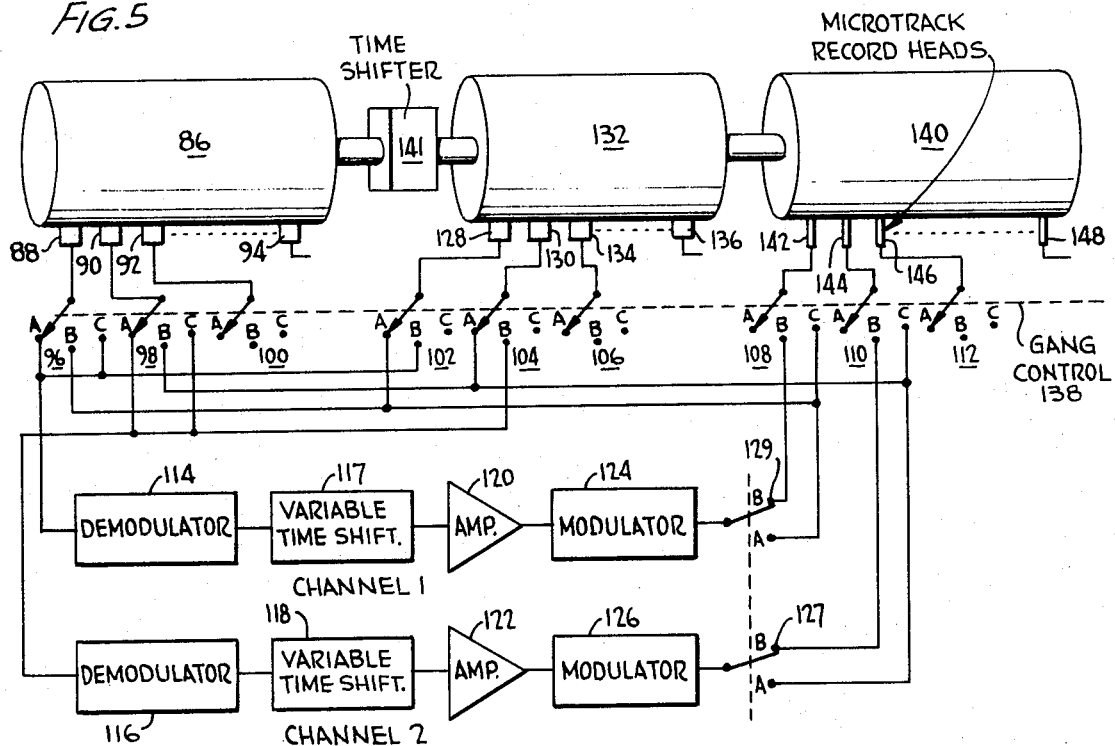
FIG. 5 illustrates an alternate form of apparatus, also in block diagram format, for accomplishing the improved method of applying time-dependent-variable corrections.

The aforedescribed method for correcting seismic traces may be accomplished by the apparatus shown in FIG. 5a. The operation of this apparatus requires that the seismic signals have been recorded on magnetic tape. Any other type of reproducible record, such as a variable density on film, would suffice with the normal playback equipment for this media. This is compatible with present technology since it is now common practice for the reflected seismic signals to be recorded directly on magnetic tape in the field. Such field recordings provide storage for a number of seismic signals on adjacent tracks. A recording containing seismic signals, which are desired to be corrected for both static and dynamic corrections, is placed on drum 10 for the purpose of converting the recorded seismic signals into electrical signals. Drum 10 includes a number of read heads 16,18,20 . . . 24, each connected to a respective channel, there being only two channels shown in FIG. 5a for the purposes of illustration. For example, a 24 track field tape would preferably require a similar number of read heads each connected to a respective one of 24 channels. The seismic signals from each of the heads would then be processed in an individual channel as described hereinafter with reference to channels 1 and 2. Time shifter 12 provides for time break (or time zero) compensation on the field tapes and is set to establish the desired relative rotational position between drum 10 and drum 14. Once set, time shifter 12 is locked so that drums 10 and 14 remain in a fixed rotational relationship and are driven at a constant speed by a drive motor (not shown).

The signals from read heads 16, 18 are demodulated by demodulators 26, 28, respectively, using the particular demodulation technique which is compatible with the modulation technique used in the field to record the seismic signals. For example, the magnetic tape could be recorded using bias modulation, frequency modulation, pulse-width modulation, or other modulation techniques known to those skilled in the art. Variable time shifters 30, 32 and 34, in channel 1, are programmable time shift apparatus which will be more fully described hereinafter. The programmed time shift in each of the time shifters 30, 32 and 34 should be independently adjustable. Variable time shifters 36, 38 and 40 in channel 2 are similar to the variable time shifters 30, 32 and 34 in channel 1, as would be all of the other variable time shifters in channels 3–24. It is necessary that the time shifts be independently variable since, in some instances, the moveout may be distributed between the time shifter elements corresponding to the subtraction of moveout in equal steps or unequal steps. Moreover, the source-to-detector distances are different for the information processed in the respective channels. A similar consideration would apply to the variable time shifters in the other channels 3–24.

It is to be understood that additional variable time shifters may be added to each of the channels to provide more than the three independent time shifts shown in FIG. 5a. Furthermore, in the event that, for example, only one time shift is desired to be introduced into a given seismic signal, only one of the variable time shifters need be programmed and the additional time shifters may be set to provide a zero time shift.

Amplifiers 42, 44, respectively amplify the delayed signals in channels 1 and 2. These amplifiers, as well as the amplifiers in the other channels not shown in FIG. 5a, may also include filters, AGC and other control features which are not essential to the present invention but which are normally provided with such amplifiers as used in the processing of seismic records. Modulators 46 and 48 are conventional modulators known to those skilled in the art for providing the desired signal modulation in accordance with the modulation technique used in the system. Recording drum 14 may be similar to the microtrack summer such as is described in U.S. Pat. No. 3,065,453 to Doty. Narrow recording heads 50, 52, 54 . . . 56, 58 are connected to receive the outputs of a modulator associated with a given channel; narrow heads 50, 52 receive the output from modulators 46, 48, respectively. The narrow recording heads record a narrow track on the magnetic tape on drum 14. These microtracks are normally less than one-twelfth of the width of a standard wide head and after a given microtrack has been recorded for each channel, all microtrack heads are moved to the right by means which are associated with drum 14 and well known to those skilled in the art. Another field tape is placed on drum 10 and the aforedescribed process repeated.

The microtrack heads are moved a distance in accordance with the CRP file which is to be recorded and the fold-coverage desired. For example, if the second field record on each channel was recorded from a CRP file farther along the traverse, as in horizontal stacking, described in U.S. Pat. No. 2,732,906 to W. H. Mayne, the microtrack heads would be moved a distance such as the center-to-center spacing between the wide heads 60, 62, 64 . . . 66, 68 on drum 14 or an integral multiple of the spacing depending on the coverage to be attained. If 24 signal channels are used on the field record and 12-fold coverage is desired, the integer would be two. However, for six-fold coverage the integer would be four; for four-fold coverage the integer would be six, etc. In practice drum 14 normally has twice the number of wide signal tracks as the number of signal tracks on the drum 10. This enables each field tape on drum 10 to be completely transferred to drum 14 in one pass. Other arrangements for switching the micro heads and the use of two tapes on drum 14 as described by Doty may make the operation faster but do not change the principle of operation described herein.

An embodiment of a typical variable time shifter for introducing the desired time shifts in the seismic signals in accordance with the invention is illustrated in FIG. 6. Storage 70 provides a means for retaining a table of moveout values of both positive and negative signs. Storage 70 may consist of a diode matrix arranged in the the form of a look-up table or it may be a drum storage unit. The device used is not material to the invention. The desired moveout values are selected from storage 70 by selector switch 72, which may be manually programmed by a plurality of manually operated pushbutton switches representing desired moveout, or automatically controlled values. For example, if storage 70 is a diode matrix, then the individual diode elements therein would each be connected to a control line from switch 72 so that upon depression of the required pushbuttons thereon, the appropriate diode elements would be activated to furnish a signal representative of the selected moveout value. The selected moveout value is provided to amplifier 74 which drives servo unit 76 to move the read head 78 on rotating drum 80. The seismic signal from modulator 26, for example, is written onto the drum surface via write head 82. Drum 80 is driven at a constant speed by a drive motor (not shown) and servo unit 76 causes read head 78 to be moved either toward or away from write head 82 in order to effect a subtraction or addition, respectively, and the seismic signals are recorded on drum 80 by write head 82. Erase head 84 is provided to erase a signal on the drum in preparation for the next seismic signal introduced into the channel. The signal obtained from movable read head 78 is provided to the succeeding variable delay unit 32. As mentioned previously, the variable time delays 32, 34, 36, 38 and 40 would be similar to variable time delay unit 30.

Those skilled in the art will recognize that the aforedescribed manner of processing seismic signals in parallel could be altered so that the seismic signals could be processed sequentially using only, for example, the apparatus of channel 1 and sequentially switching the input to demodulator 26 to successive read heads on drum 14. However, the preferred practice is to use a plurality of channels to convert the data simultaneously as described above.

The apparatus shown in FIG. 5b represents an alternate embodiment for carrying out the method of the invention using only one variable time shifter per channel. The field tape is placed on drum 86, and the recorded seismic signals read by read heads 88, 90, 92 . . . 94 with gang controlled switches 96, 98, 100, 102, 104, 106, 108, 110 and 112 in switch position A. Only two channels for processing the seismic data are illustrated in FIG. 5b; however, in a workable apparatus there would be a number of channels corresponding to the number of read heads on drum 86. The following description of the operation of channels 1 and 2 is to be taken as illustrative of the operation of the additional channels. The information read from the tape on drum 86 by read head 88 and 90 is demodulated by demodulators 114, 116, respectively, and provided to variable time shifters 117 and 118. Variable time shifter circuits 117 and 118 are similar to the apparatus described in detail above and illustrated in FIG. 6. The delayed signals are then amplified by amplifiers 120, 122, modulated by modulators 124, 126 and recorded by read-write heads 128, 130 on a magnetic tape placed on drum 132. Gang-controlled switches 127, 129 are in switch position A and their function will be described more fully hereinafter. These switches may also be operated by any gang control device known to the art. Additional read-write heads 134 . . . 136 are also provided to record the information from the additional channels. This description assumes that the moveout is being applied in a number of successive steps, for example, three steps. The operation for moveout corrections for other than three steps will be more fully described hereinafter. A blank transfer tape is placed on drum 86 and switches 96–112 are transferred to switch position B by gang control 138, which may be manually operated or automatically controlled by any means known to the art. Switches 127 and 129 remain in position A. The seismic signals previously recorded on drum 132 are then read by read-write head 128, 130 and processed by the circuitry in channels in 1 and 2 as previously described and the information recorded on the blank transfer tape on drum 86. Gang control 138 then transfers switches 96–112 to switch position C, switches 127 and 129 remain in position A, and the aforementioned process is repeated with the desired variable time shift inserted into variable time shifters 117 and 118 as previously described. The processed information is then recorded on summing drum 140 by write heads 142 and 144. Additional heads 146 . . . 148 are provided on drum 140 to record the information from the remaining channels.

The second and succeeding field tapes thereafter would be processed in a similar manner as described above and each of the seismic signals recorded on a microtrack of summing drum 140. The data from the same CRP file on successive field tapes is placed on adjacent microtracks of drum 140 and the individual signals are summed by a wide head (not shown) as is customary in the processing of seismic records in order to obtain a stacked signal trace.

In the apparatus shown in FIG. 5b, drums 86 and 132 are similar to drum 10 of FIG. 5a with the exception that drums 86 and 132 are provided with read-write heads as described above. Summing drum 140 is similar to drum 14 of FIG. 5a; the wide read heads not being illustrated in FIG. 5b. Summing drum 140 preferably includes at least 12 microtracks per each wide track to permit the use of 12-fold stack coverage in a single operation. Time shifter 141 provides the same function described above with respect to time shifter 12.

It is apparent that the apparatus illustrated in FIG. 5b may provide any number of successive processing operations as described above. For example, if the moveout is to be provided in one step, the individual moveout correction would be programmed into the respective variable time shifters in the individual channels and the information on the field tape on drum 86 would be transferred to the respective microtracks on drum 140 by placing switches 96–112 in switch position C. Switches 127 and 129 are in switch position A.

Two successive time shifts may be carried out as follows. Switches 96–112 and switches 127, 129 are placed in switch position A and the seismic signals recorded on drum 132 as described above. Switches 96–112 and switches 127, 129 are the placed in switch position B and the signals processed through the respective channels. However, with switches 127, 129 in position B the processed data signals will be transferred to drum 140 for a subsequent stacking operation instead of being transferred to drum 86 as previously described.

Four successive time shifts may be achieved by switching switches 96–112 successively to switch positions A, B, A, and B. The information on drum 86 is processed with switches 127, 129 in position A for three of the time delay operations; however, when switches 96–112 are transferred to switch position B for the fourth time shift process, switches 127, 129 are transferred to position B to record the data on drum 140.

From the above description, it is apparent that any number of successive time shifts may be carried out on the apparatus with appropriate modification of the procedure described above.

Those skilled in the art will recognize that the methods for applying moveout corrections to seismic signals may also be obtained by the use of digital apparatus. For example, a general purpose digital computer may be programmed in accordance with the principles set forth above to obtain the reduced frequency alteration of the corrected seismic traces or a special purpose computer may be constructed having a built-in program to perform the steps of the invention. The latter embodiment is quite apparent in view of the foregoing description using analog apparatus in view of the known equivalents between digital and analog apparatus.

Having thus described the invention, what is claimed as new and desired to be secured by Letters Patent is:

1. A method for applying time-dependent variable corrections to seismic traces, comprising the steps of:
   generating seismic traces representing reflection signals received at a plurality of different detector locations each having different source-to-detector distance being any non-zero detector location;
   determining the total time-dependent variable correction for the reflection signals in each seismic trace;
   applying a portion of said total time-dependent variable correction to each of the respective seismic traces; and
   applying the remaining portions of said total time-dependent variable correction to each of the respective seismic traces until the total time-dependent variable correction has been applied thereto.

2. A method according to claim 1 wherein said time-dependent variable corrections are moveout corrections.

3. A method according to claim 1 wherein the application of the time-dependent variable corrections shifts the seismic traces obtained from detector locations further removed from an associated seismic source location into coincidence with the trace obtained from a detector location more closely spaced to said associated seismic source.

4. A method according to claim 3 wherein the time-dependent variable corrections shift the traces obtained from the detector locations further removed from the associated seismic source location into coincidence with one intermediate reference location between said closely spaced and further removed detector location.

5. A method for aligning reflections on seismic traces obtained from detectors located at spaced distances from a seismic source, comprising the steps of:
   selecting a datum point intermediate the seismic source location and a trace obtained from a remotely located detector;
   determining discrete moveout values for the seismic traces at intermediate locations between the seismic source location and the intermediate datum point and also between the intermediate datum point and said trace obtained from a remotely located detector; and
   applying the discrete moveout values to the traces in discrete steps by shifting the traces between the seismic source location and the intermediate datum point to the intermediate datum point and shifting the remote traces to the intermediate datum point.

6. A method according to claim 5 wherein the seismic signal frequency alteration of the traces shifted between the seismic source location and the datum point is substantially equal to the seismic signal freuqency alteration of the remote traces shifted to the datum point.

7. A method for aligning reflections on seismic traces obtained from detectors located at spaced distances from a seismic source, comprising the steps of:
   selecting a datum point intermediate the seismic source location and a trace obtained from a remotely located detector;
   determining discrete time-dependent values for the seismic traces at intermediate locations between the seismic source location and the intermediate datum point and also between the intermediate datum point and said trace obtained from a remotely located detector; and
   applying the discrete time-dependent values to the traces in discrete steps by shifting the traces between the said source location and the intermediate datum point to the intermediate datum point and shifting the remote traces to the intermediate datum point.

8. A method for processing seismic traces from a common reflection point, the seismic traces being developed at a plurality of source-to-detector distances, comprising the steps of:

determining the time-dependent variable corrections for shifting the seismic traces into coincidence for a predetermined distance greater than the source-to-detector distance of the nearest trace;

applying said time-dependent variable corrections to the seismic traces to form corrected traces; and stacking said corrected traces.

9. A method according to claim 8 and including the steps of:

repeating for subsequent common reflection points along a traverse;

applying said time-dependent variable corrections to the seismic traces there developed to form additional corrected traces; and stacking said additional corrected traces.

10. A method for processing a plurality of seismic traces from a common reflection point, the plurality of seismic traces being developed at a plurality of source-to-detector distances, comprising the steps of:

selecting a first time-dependent variable correction for a first of said plurality of seismic traces, said first time-dependent variable correction being less than the normal moveout correction for said first trace;

selecting a second time-dependent variable correction for a second of said plurality of seismic traces, said second time-dependent variable correction having the value to align desired reflection in said first and second traces;

selecting subsequent time-dependent variable corrections for subsequent ones of said plurality of seismic traces, said subsequent time-dependent variable corrections having the values to align desired reflections in said first and subsequent ones of said traces;

applying the respective time-dependent variable corrections to the respective traces of said plurality of traces to form a plurality of corrected traces; and stacking said corrected traces.

11. A method for processing seismic traces from common reflection points, the seismic traces being developed at a plurality of source-to-detector distances, comprising the steps of:

selecting an intermediate non-zero source-to-detector distance from said plurality of source-to-detector distances;

determining the time-dependent variable correction for a source-to-detector distance greater than said selected non-zero source-to-detector distance;

applying said time-dependent variable corrections to the seismic traces to form corrected traces; and stacking said corrected traces.

12. A method for processing seismic traces from a common reflection point, the seismic traces being developed at a plurality of source-to-detector distances, wherein the initial portions of the more remote traces are deleted, comprising the steps of:

selecting a reference source-to-detector distance initially corresponding to the source-to-detector distance for a near trace;

increasing the distance of said source-to-detector reference distance as a function of time;

correcting other seismic traces from the same common reflection point to said source-to-detector reference distance; and stacking said corrected seismic traces.

13. A method for processing seismic traces from common reflection points, the seismic traces being developed at a plurality of source-to-detector distances; said method comprising the steps of:

selecting a stacking reference initially corresponding to the source-to-detector distance for a near trace;

increasing the distance of said stacking reference as a function of time;

correcting other seismic traces from the same common reflection point to said stacking reference; and stacking said corrected seismic traces.

14. The method of claim 13 including the step of:

deleting the initial portions of the more remote traces preceding selection of said stacking reference.

15. The method of claim 13 wherein said steps are repeated for a succession of common reflection points along a traverse.

16. The method of claim 14 wherein said stacking reference increases as a function of time such that the stacking reference is in order of one-half to seven-tenths of the source-to-detector distance of the farthest trace which is not deleted at each successive common reflection point.

* * * * *